US010334467B2

(12) United States Patent
Sun et al.

(10) Patent No.: US 10,334,467 B2
(45) Date of Patent: Jun. 25, 2019

(54) METHOD AND RADIO NETWORK NODE FOR ESTIMATING CHANNEL QUALITY (71) Applicant: TELEFONAKTIEBOLAGET LM ERICSSON (PUBL), Stockholm (SE)

(72) Inventors: Ying Sun, Sundbyberg (SE); Jianwei Zhang, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 42 days.

(21) Appl. No.: 15/533,920

(22) PCT Filed: Dec. 8, 2014

(86) PCT No.: PCT/SE2014/051465
§ 371 (c)(1),
(2) Date: Jun. 7, 2017

(87) PCT Pub. No.: WO2016/093745
PCT Pub. Date: Jun. 16, 2016

(65) Prior Publication Data
US 2017/0339593 A1 Nov. 23, 2017

(51) Int. Cl.
H04W 24/10 (2009.01)
H04L 5/00 (2006.01)
(Continued)

(52) U.S. Cl.
CPC .......... *H04W 24/10* (2013.01); *H04B 17/336* (2015.01); *H04L 5/0051* (2013.01); *H04L 5/14* (2013.01)

(58) Field of Classification Search
CPC .... H04W 24/10; H04B 17/336; H04L 5/0051; H04L 5/14
See application file for complete search history.

(56) References Cited

U.S. PATENT DOCUMENTS 9,137,001 B2 * 9/2015 Shah ............... H04L 5/0058
9,173,164 B1 * 10/2015 Prock .............. H04W 48/16
(Continued)

OTHER PUBLICATIONS

3GPP TS 36.211 V113.0 3rd Generation Partnership Project; Technical Specification Group Radio Access Network; Evolved Universal Terrestrial Radio Access (E-UTRA); Physical Channels and Modulation (Release 11), Jun. 2013.
(Continued)

*Primary Examiner* — Tejis Daya (57) ABSTRACT

A method and a radio network node for estimating channel quality for a downlink transmission to a user equipment. The radio network node operates a first sector and a second sector. The radio network node is configured to send CSI-RS in the first and second sectors. The radio network node receives uplink reference signals, and determines a command based on the uplink reference signals, wherein the command indicates one of said at least one radio resource to be configured for CSI-RS. The radio network node sends the command to the user equipment, and receives a set of CSI reports, wherein the reports are generated by the user equipment according to the command. The radio network node receives further uplink reference signals from the user equipment, and estimates channel quality for the downlink transmission based on the set of CSI reports and the further uplink reference signals.

20 Claims, 3 Drawing Sheets (51) Int. Cl.
    *H04B 17/336*     (2015.01)
    *H04L 5/14*     (2006.01)

(56) References Cited

U.S. PATENT DOCUMENTS

| | | | | |
|---|---|---|---|---|
| 9,320,050 | B2* | 4/2016 | Singh | H04W 72/10 |
| 9,350,476 | B2* | 5/2016 | Lee | H04J 11/005 |
| 9,414,286 | B1* | 8/2016 | Oroskar | H04W 36/0083 |
| 9,743,384 | B2* | 8/2017 | Nagata | H04W 24/10 |
| 9,801,167 | B2* | 10/2017 | Moulsley | H04B 7/024 |
| 9,832,732 | B2* | 11/2017 | Ouchi | H04W 52/242 |
| 2009/0233646 | A1* | 9/2009 | Cyzs | H04B 7/0491 |
| | | | | 455/562.1 |
| 2012/0083262 | A1* | 4/2012 | Dimou | H04W 36/0055 |
| | | | | 455/423 |
| 2012/0122472 | A1* | 5/2012 | Krishnamurthy | H04L 5/0053 |
| | | | | 455/456.1 |
| 2012/0127878 | A1* | 5/2012 | Kim | H04W 74/002 |
| | | | | 370/252 |
| 2012/0201163 | A1* | 8/2012 | Jongren | H04W 24/10 |
| | | | | 370/252 |
| 2012/0207043 | A1* | 8/2012 | Geirhofer | H04L 5/0048 |
| | | | | 370/252 |
| 2013/0235807 | A1* | 9/2013 | Lee | H04W 16/28 |
| | | | | 370/329 |
| 2013/0242773 | A1* | 9/2013 | Wernersson | H04B 7/024 |
| | | | | 370/252 |
| 2013/0308652 | A1* | 11/2013 | Rich, Jr. | H04L 49/90 |
| | | | | 370/428 |
| 2013/0344909 | A1* | 12/2013 | Davydov | H04B 7/0689 |
| | | | | 455/501 |
| 2014/0010129 | A1* | 1/2014 | Rubin | H04W 16/14 |
| | | | | 370/280 |
| 2014/0286182 | A1* | 9/2014 | Chen | H04L 1/0026 |
| | | | | 370/252 |
| 2014/0301297 | A1* | 10/2014 | Geirhofer | H04L 5/0053 |
| | | | | 370/329 |
| 2015/0189644 | A1* | 7/2015 | Lorca Hernando | H04B 7/024 |
| | | | | 370/329 |
| 2016/0294531 | A1* | 10/2016 | Loehr | H04W 72/0413 |
| 2016/0308652 | A1* | 10/2016 | Sun | H04B 7/0626 |

OTHER PUBLICATIONS

3GPP TS 36.213 V11.3.0 3rd Generation Partnership Project; Technical Specification Group Radio Access Network; Evolved Universal Terrestrial Radio Access (E-UTRA); Physical layer procedures (Release 11), Jun. 2013.

3GPP TS 36331 V113.0 3rd Generation Partnership Project; Technical Specification Group Radio Access Network; Evolved Universal Terrestrial Radio Access (E-UTRA); Radio Resource Control (RRC); Protocol specification (Release 11), Mar. 2013.

* cited by examiner

METHOD AND RADIO NETWORK NODE FOR ESTIMATING CHANNEL QUALITY

TECHNICAL FIELD

Embodiments herein relate to wireless communication systems, such as telecommunication systems. A method and a radio network node for estimating channel quality for a downlink transmission to a user equipment are disclosed. Moreover, a corresponding computer program and a carrier therefor are also disclosed.

BACKGROUND

In a telecommunication, quality of a connection between a base station and a user equipment is typically estimated by means of measuring on certain known signals. Downlink refers to transmission from the base station to the user equipment and uplink refers to transmission from the user equipment to the base station.

As an example of a known telecommunication network, a Third Generation Partnership Project (3GPP) Long Term Evolution (LTE) network is considered. With the LTE network, the certain known signals are referred to as reference signals. Within LTE, various reference signals have been introduced. LTE uses Orthogonal Frequency Division Multiplexing (OFDM) to form a time-frequency structure. A time domain is divided into subframes, where each subframe, including two slots, is 1 ms. Each slot typically includes 7 OFDM symbols. A frequency domain is divided into subcarriers. In the time-frequency domain, a resource block is defined by 12 subcarriers in the frequency domain and one slot in the time domain. A resource element is defined by one subcarrier in the frequency domain and one OFDM symbol in the time domain.

Firstly, Cell-Specific Reference Signals (CS-RS) are described. The CS-RS are downlink reference signals transmitted in every downlink subframe in the time domain and in every resource block in the frequency domain. Thus, the CS-RS can cover an entire bandwidth of a cell. The CS-RS is used by the user equipments for channel estimation for coherent demodulation of any downlink physical channel, except for Physical Multicast Channel (PMCH), and for Physical Downlink Shared Channel (PDSCH) in the case of Transmission Modes (TM) 7, 8, and 9. For release 8 and 9 user equipments, it is also used by the user equipment to acquire Channel State Information (CSI).

Secondly, Channel State Information Reference Signals (CSI-RS) are described. The CSI-RS are intended for release 10 user equipments and release 10+user equipments in order to acquire CSI. Specifically, in release 10, the CSI-RS are used for transmission mode 9 (TM9). A reason for introducing CSI-RS is to improve channel estimation for coherent demodulation even with extreme channel conditions, including fast channel variations in both the time and frequency domains without introducing more overhead than necessary. The CSI-RS, which only targets CSI, has a flexible, and in general lower, time/frequency density than CS-RS. Thus, a lower overhead is introduced than if CS-RS would be extended to target CSI.

For TM9 user equipments, a signal is measured on CSI-RS. In TM9 interference is taken on the CRS resource as the sum of noise and other cells CRS interference or data interference.

The configuration of a resource for CSI-RS is performed with Radio Resource Control (RRC) signalling. A mapping of the resource for CSI-RS to a resource elements is defined in Table 6.10.5.2-1 for normal cyclic prefix and 6.10.5.2.2 for extended cyclic prefix in 3GPP TS 36.211 V11.3.0.

For TM9, two parameters need to be addressed in the RRC signalling, or RRC configuration, see 3GPP TS 36.331 V11.3.0, to configure CSI, CSI-RS and zeroTxPowerCSI-RS. It is possible to configure one CSI-RS per cell/sector. Basically, to measure the channel quality of CSI-RS of one cell/sector accurately, the neighboring cells/sectors' CSI-RSes have to be muted, i.e., configured with zeroTxPowerCSI-RS. Furthermore, in TM9, only one CSI report is supported.

Consider a known telecommunication network, which is described with reference to LTE, comprising a base station, or eNB, which operates a cell, such as a multi-sector cell. The cell includes two or more sectors. The sectors may be configured with the same or different resource for transmission, by the base station, of the CSI-RS. In the following, it is assumed that the cell includes a first sector and a second sector. User equipment is also located in the cell.

In a first scenario, a first and a second resource for CSI-RS are configured in the first and second sector, respectively. This means that different resources are configured in different sectors.

If the user equipment is located in an area that has good coverage from the first and second sectors, the user equipment can receive Physical Downlink Shared Channel (PDSCH) data from both sectors. The area with good coverage can be at an edge between the first and second sector, e.g. at any distance from the base station. However, a Channel Quality Indicator (CQI) report, from the user equipment, is based on CSI-RS will reflect transmission from only one of the sectors. A reason for this is that the user equipment can only support one CSI-RS configuration at any given time. This means that it is not possible for the user equipment to be configured with different resources for the first and second sectors in which it is located. Therefore, the CQI report is underestimated. As a consequence, the base station will assign the user equipment with a lower data rate than the user equipment actually is capable of. A disadvantage is thus that transmission in the multiple sectors according to TM9 is thus not fully exploited.

In a second scenario, a common resource for CSI-RS is configured in the first and second sectors. This means that the same resource is configured in different sectors.

Again, if the user equipment is located in an area that has good coverage from the first and second sectors, the user equipment can receive CSI-RS from both sectors, but the user equipment can only receive PDSCH data from one sector. In effect, the CQI report, generated by the user equipment, based on CSI-RS is overestimated. However, the base station is not aware of this inaccuracy of the CQI report. Therefore, the base station will assign, to the user equipment, a higher data rate than the user equipment actually is capable of. This leads to failed data transmission, which could cause overload the base station due to unnecessary retransmissions. In general, a disadvantage may be that an overall throughput may be degenerated.

In order to so reduce the above mentioned disadvantages, it has been proposed to change CSI-RS configuration in the user equipment when the selected sectors are changed. A problem in this regard is that an RRC reconfiguration is very costly, e.g. in terms of time and resources.

Furthermore, it has been proposed to configure the user equipment with a resource for one CSI-RS at a time, but time dynamically share the resource with different sectors in different time instances, such as time slots. This means that the base station transmits the same CSI-RS at the same resource from different sectors at different time instances. The base station can then obtain the channel quality measurement of different sectors by keeping track of the time instance and the measurement of CSI reports from the transmissions of different sectors at different time instances.

However, a problem is how to perform filtering of the CSI-RS from different sectors in the user equipment. Since the user equipment is not aware of the change of the transmitting sector, there is a risk that the measurement results from the different sectors are filtered together and the measurement results will be inaccurate.

SUMMARY

An object is to improve performance of a telecommunication system of the above mentioned kind. For example, improvement of performance for transmissions to a user equipment operated in TM9 is sought to be achieved.

According to an aspect, this object is achieved by a method, performed by a radio network node, for estimating channel quality for a downlink transmission to a user equipment. The radio network node operates a radio carrier, forming a first sector and a second sector, wherein the user equipment is located in the first and second sectors, wherein the radio network node is configured to send, on at least one radio resource of the radio carrier, Channel State Information Reference Signals "CSI-RS" in the first and second sectors. The user equipment is configured to receive, on the radio carrier, the downlink transmission from both the first and second sectors. The radio network node receives uplink reference signals from the user equipment. The radio network node determines a command based on the uplink reference signals, wherein the command indicates one of said at least one radio resource to be configured for reception of the CSI-RS in the user equipment. Next, the radio network node sends the command to the user equipment, whereby the user equipment is able to measure Channel State Information for the radio carrier according to the command. Furthermore, the radio network node receives, from the user equipment, a set of CSI reports, wherein the reports are generated by the user equipment according to the command. The radio network node receives, on the radio carrier, further uplink reference signals from the user equipment. Moreover, the radio network node estimates channel quality for the downlink transmission based on the set of CSI reports and the further uplink reference signals.

According to another aspect, this object is achieved by a radio network node configured to estimate channel quality for a downlink transmission to a user equipment. The radio network node operates a radio carrier, forming a first sector and a second sector, wherein the user equipment is located in the first and second sectors, wherein the radio network node is configured to send, on at least one radio resource of the radio carrier, Channel State Information Reference Signals "CSI-RS" in the first and second sectors. The user equipment is configured to receive, on the radio carrier, the downlink transmission from both the first and second sectors. The radio network node is configured to receive uplink reference signals from the user equipment, and to determine a command based on the uplink reference signals, wherein the command indicates one of said at least one radio resource to be configured for reception of the CSI-RS in the user equipment. Moreover, the radio network node is configured to send the command to the user equipment, whereby the user equipment is able to measure Channel State Information for the radio carrier according to the command. Furthermore, the radio network node is configured to receive, from the user equipment, a set of CSI reports, wherein the reports are generated by the user equipment according to the command, and to receive, on the radio carrier, further uplink reference signals from the user equipment. The radio network node is further configured to estimate channel quality for the downlink transmission based on the set of CSI reports and the further uplink reference signals.

According to further aspects, the object is achieved by a computer program and a carrier for the computer program corresponding to the aspects above.

The radio network node determines, or detects, if the user equipment is located within both of the first and second sectors by use of the uplink reference signals. Then, the radio network node sets, or determines, the command to indicate which said at least one radio resource to be configured for reception of the CSI-RS in the user equipment.

According to some first embodiments, a first radio resource may be configured in the user equipment for the first sector and a second radio resource may be configured in the user equipment for the second sector. However, only one of the first and second radio resources may be configured in the user equipment at any given time.

According to some second embodiments, a common radio resource may be configured in the user equipment for the first and second sectors.

In these manners, the radio network node set ups, or configured, the user equipment to receive the downlink transmission from both the first and second sectors.

Moreover, the radio network node receives, from the user equipment, the set of CSI reports and further uplink transmissions. Now, the radio network node uses the further uplink transmissions to determine whether or not the previously configured radio resource, such as the first, second or common radio resource, still applies for the user equipment. Hence, if appropriate, the radio network node compensates the received set of CSI report with it current knowledge, obtained from the further uplink reference signal, about which configuration of the at least one radio resource, presently would be configured. Therefore, the radio network node estimates the channel quality for the downlink transmission based on the set of CSI reports and the further uplink reference signals. Expressed differently, the radio network node estimates the channel quality based on the set of CSI reports while taking the further uplink reference signals into account. This means that a downlink channel quality, e.g. the channel quality above, is estimated based on uplink measurement, e.g. both the uplink reference signals and the further uplink reference signals above, and downlink measurement, e.g. the CSI reports above, for a telecommunication system.

In one example, there is provided a method to estimate, e.g. predict, channel quality, e.g. expressed as Channel State Information, based on the set of CSI reports from the user equipment. The estimated CSI is compensated, by the radio network node, while using knowledge about from which sector, or sectors, the user equipment is capable of receiving the downlink transmission, e.g. on Physical Downlink Shared Channel (PDSCH). The knowledge is obtained by measuring on the further uplink reference signals. The further uplink reference signals are closer in time, i.e. more recent, than the uplink reference signals, on which the configuration of the CSI-RS was based, in relation to an upcoming time slot, such as a subframe, in which the downlink transmission may be transmitted. Thanks to that the determination of the CSI is made more accurate the radio network node may use a more accurate coding rate for the user equipment. In this manner, data throughput for both the radio network node and the user equipment may be increased while a Block-Error-Rate target is maintained.

Advantageously, an improved estimate of the channel quality is obtained without re-configuring the user equipment with respect to radio resource for reception of CSI-RS at the user equipment. A reconfiguration of the user equipment would require a certain time period to laps before such reconfiguration takes effect.

As mentioned in the background section, a restriction of TM9 is that only one resource for CSI-RS measurement can be configured at any given time. According to the embodiments herein, this restriction is overcome, without performing RRC reconfiguration of the CSI-RS, thanks to that a mismatch between the PDSCH transmission and CSI-RS transmission is compensated in the radio network nodes estimation of the channel quality. In some examples, the estimated channel quality is used to achieve improved accuracy in scheduling and link adaptation.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 1:
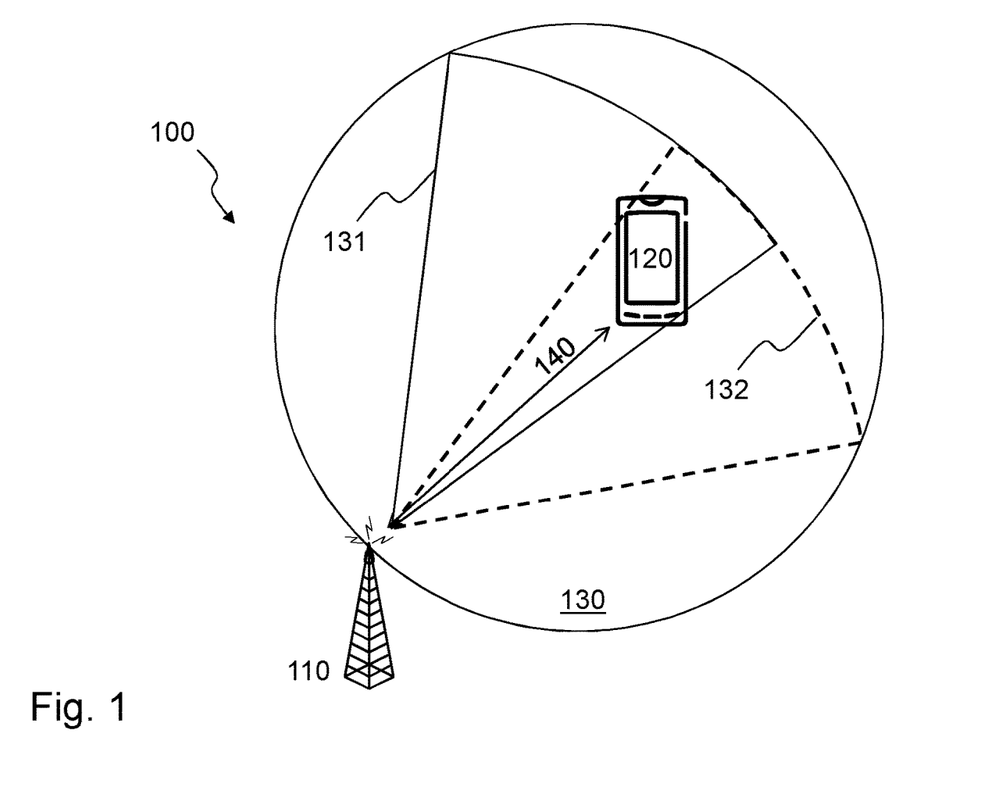
FIG. 1 is a schematic overview of an exemplifying wireless communication system in which embodiments herein may be implemented.

FIG. 1 depicts an exemplifying wireless communications system 100 in which embodiments herein may be implemented. In this example, the wireless communications system 100 is a Long Term Evolution (LTE) system. In other examples, the wireless communication system 100 may be any 3GPP cellular communication system, such as a Wideband Code Division Multiple Access (WCDMA) network, a Global System for Mobile communication (GSM network) or the like.

The wireless communication system 100 comprises a radio network node 110. As used herein, the term "radio network node" may refer to an evolved Node B (eNB), a control node controlling one or more Remote Radio Units (RRUs), a radio base station, a base station, an access point or the like. The radio network node 110 may operate in Time Division Duplex (TDD) mode or Frequency Division Duplex (FDD) mode.

Moreover, a user equipment 120 may be comprised in the wireless communication system 100. The radio network node 110 may have configured the user equipment 120 to operate in transmission mode 9 (TM9).

As used herein, the term "user equipment" may refer to a mobile phone, a cellular phone, a Personal Digital Assistant (PDA) equipped with radio communication capabilities, a wireless device, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. The term "user" may also be used interchangeable with "user equipment".

The radio network node 110 may operate a cell 130, in which the user equipment 120 is located. Expressed differently, the user equipment 120 may be associated with the cell 130. The cells 130 may comprise a first sector 131 and a second sector 132. The first sector 131 may be neighbouring to the second sector 132.

This means that the radio network node 110 operates a radio carrier, forming a first sector 131 and a second sector 132. Or expressed oppositely, the radio network node 110 may operate the first and second sectors 131, 132 on the radio carrier. The radio network node 110 is configured to send, on at least one radio resource of the radio carrier, CSI-RS in the first and second sectors 131, 132.

The user equipment 120 is located in the first and second sectors 131, 132 Accordingly, the user equipment 120 is configured to receive, on the radio carrier, downlink transmission from both the first and second sectors 131, 132 The user equipment 120 may thus be said to receive joint transmissions from the first and second sectors 131, 132.

Figure 2:
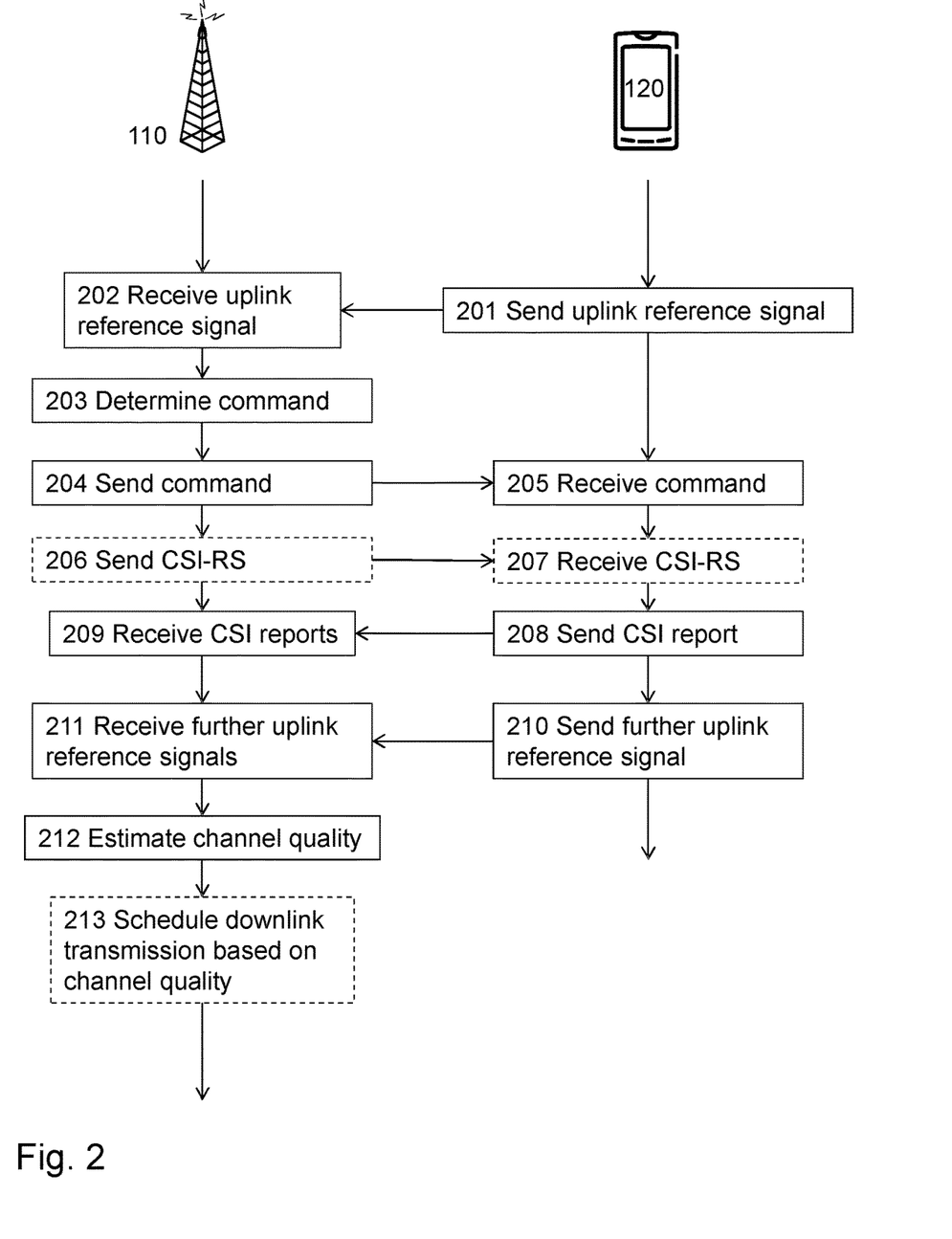
FIG. 2 is a combined signaling scheme and flowchart illustrating the methods herein.

FIG. 2 illustrates an exemplifying method according to embodiments herein when implemented in the wireless communication system 100 of FIG. 1. Thus, the radio network node 110 performs a method for estimating channel quality for a downlink transmission to the user equipment 120.

Initially, the radio network node 110 may detect that there is downlink data, or downlink transmission, to be sent. The downlink data may be any payload data, such as voice data, data files, video data etc. In other examples, the user equipment 120 may be in active state, e.g. RRC_CONNECTED mode in case of LTE. In this mode, the CSI-RS may be configured for the user equipment 120.

One or more of the following actions may be performed in any suitable order.

Action 201

The user equipment 120 sends uplink reference signals, such as Sounding Reference Signals (SRS) or the like, to e.g. the radio network node 110.

Action 202

The radio network node 110 receives the uplink reference signals from the user equipment 120. Expressed differently, the radio network node 110 measures the uplink reference signals to achieve an estimated uplink signal quality. The SRS may be received on Physical Uplink Control Channel (PUCCH), Physical Uplink Shared Channel (PUSCH), Physical Random Access Channel (PRACH) or the like.

Action 203

The radio network node 110 determines 203 a command based on the uplink reference signals. The command indicates one of said at least one radio resource to be configured for reception of the CSI-RS in the user equipment 120. Expressed differently, the command may indicate one or more radio resources for reference signals, such as the CSI-RS, sent by the radio network node 110 to the user equipment 120. The user equipment 120 may then be able to determine a channel state of the radio carrier based on the reference signals when the user equipment 120 is configured with the one or more radio resources, whereby the user equipment 120 is able to find the reference signals.

Thus, in this action, the radio network node prepares for a configuration of CSI-RS based on the estimated uplink signal quality, as in action 202, for the user equipment 120, which as mentioned is in TM9. The command may indicate the configuration to be used by the user equipment 120.

With the first embodiments, mentioned in the summary section, the CSI-RS configured in the user equipment 120 is according to the CSI-RS of the sector, such as the first or second sector 131, 132, that gives the strongest estimated received signal power at the user equipment 120. The estimated received signal power is as below equation:

$$P_{i,e}^{RX} = P_i^{TX} G_{i,e}, \text{ where}$$

$P_{i,e}^{RX}$: the estimated received power from sector i,
$P_i^{TX}$: the transmit power from sector i,
$G_{i,e}$: the estimated downlink signal quality gain from sector i to the UE, which is estimated from uplink signal quality $G_i^{UL} \cdot G_{i,e}$=filtered $G_I^{UL}$. The uplink estimated channel gain of sector i could be obtained by: $G_i^{UL} = P_i^{UL}/P_e^{TX}$ where $P_i^{UL}$ is the uplink received power at sector i, and $P_e^{TX}$ is the estimated UE transmit power. $P_e^{TX}$ is obtained based on the uplink Power Headroom Report(PHR) transmitted by the user equipment 120.

i is the sector index within the combined cell sectors, S. Hence, in order to select the sector out of the first and second sectors 131, 132, which selected sector I gives the maximal value, or almost maximal value, of the estimated received power in downlink. Thus, selected sector i is given by:

$$\max_{i \in S} P_i^{RX}$$

This means that the radio network node 110 will configure, see action 204 below, the UE with the CSI-RS of sector I, e.g. with Radio Resource Control (RRC) signaling.

With the second embodiments, mentioned in the summary section, the first and second sectors 131, 132 of the cell 130 may be configured with the same radio resource for CSI-RS, which is used to configure the user equipment 120, and any other user equipments (not shown) within the cell 130.

Action 204

The radio network node 110 sends the command to the user equipment 120. In this manner, the user equipment 120 is able to measure Channel State Information for the radio carrier according to the command, since the user equipment 120 has been informed about which radio resource to measure on with the help of the command.

Action 205

Subsequent to action 204, the user equipment 120 receives the command, e.g. in the form of an RRC reconfiguration.

Action 206

The radio network node 110 may send CSI-RS to e.g. the user equipment 120.

Action 207

Following action 205 and 206, the user equipment 120 receives the CSI-RS from the radio network node 110. Thanks to action 205, the user equipment 120 has been made aware of which radio resource to measure on in order to build, or generate, a CSI report.

The user equipment 120 may accordingly begin to measure a downlink signal quality at the configured CSI-RS resource, such as the first, second or common radio resource, and then in action 208 below send CSI reports at the configured occasion. According to 3GPP, the channel quality and interference of a user equipment supporting 3GPP Release 8 and 9 are measured on CRS, but for a user equipment supporting 3GPP Release 10, the channel quality is measured at CSI-RS resource, the interference and noise is measured at CRS.

With the first embodiments, the channel quality to be reported may be equal to $$SINR_i = \frac{P_i^{RX}}{I+n},$$

where
$SINR_i$: is the reported received signal quality, SINR value of sector i. If the UE is performing rank two transmission, two CSI reports are correspondent to different ranks.
$P_i^{RX}$: is the true received signal quality of the UE from sector i.
I: Interference measured on CRS, same for all sectors.
n: Thermo noise, assumes the same for all the sectors With the second embodiments, the channel quality where both sectors at the same CSI-RS resource reported by the user equipment 120 is equal to $$SINR = \frac{\sum_{i=0}^{i=S-1} P_i^{RX}}{I+n},$$

where
SINR : is the reported UE received channel quality, SINR value from all sectors within the combined cell, S. If the UE is performing rank two transmission, two CSI reports are correspondent to different ranks.
S: sector index of all sectors within the combined cell that are transmitting PDSCH.

Action 208

The user equipment 120 sends a set of CSI reports. The set of CSI reports may include one or more CSI reports. One CSI report may include information about CQI, Rank Indicator (RI), Pre-coding Matrix Indicator (PMI), SINR, SNR, SIR or the like.

Action 209

The radio network node 110 receives 209, from the user equipment 120, the set of CSI reports. It shall be noted that the set of CSI report may include one or more CSI reports. The one or more reports are generated by the user equipment 120 according to the command, e.g. subsequent to, or within, action 207.

Action 210

The user equipment sends further uplink reference signals to e.g. the radio network node 110.

Action 211

Subsequent to action 210, the radio network node 110 receives, on the radio carrier, the further uplink reference signals from the user equipment 120.

Action 212

The radio network node 110 estimates channel quality, e.g. in terms of SINR, for the downlink transmission based on the set of CSI reports and the further uplink reference signals.

The channel quality may be a Signal-To-Interference-and-Noise-ratio, a Signal-To-Interference-ratio, a Signal-To-Noise-ratio, a Reference Signal Received Power, a Received Signal Strength Indicator, Reference Signal Received Quality or the like.

With the first embodiments, the at least one radio resource may comprise a first radio resource and a second radio resource, wherein the radio network node 110 may be configured to send CSI-RS on the first radio resource for the first sector 131, and to send CSI-RS on the second radio resource for the second sector 132.

In these embodiments, the command may indicate the first radio resource to be configured for the CSI-RS in the user equipment 120, when power received at the user equipment 120 for the first sector 131 may be greater than power received at the user equipment 120 for the second sector 132, wherein power received at the user equipment 120 may be estimated based on the uplink reference signals.

Continuing with the first embodiments, different CSI-RS may be configured for different sectors, such as the first and second sectors 131, 132 in the combined cell 130 and joint downlink transmission of PDSCH is performed for both sectors. But the user equipment 120 has been configured with the radio resource(s) for reception of according to only one of the sectors' CSI-RS configuration. Then, the set of CSI reports, from the user equipment 120, are based on measurement of received signal from the configured sector, such as the first or second sector 131, 132 Estimation of the channel quality may be computed based on, where channel quality is given in terms of SINR:

$$SINR_{PDSCH} = \left(1 + \frac{P_j^{TX} G_{j,e}}{P_i^{TX} G_{i,e}}\right) SINR_i, \quad \text{(Eq. 1)}$$

where $G_{j,e}$ is the estimated downlink channel quality gain from the joint transmitted sector j.

$P_j^{TX}$ is the downlink PDSCH transmit power of the joint transmitted sector j.

$G_{i,e}$ is the estimated downlink channel quality gain from the CSI reported sector i $P_i^{TX}$ is the downlink PDSCH transmit power of the CSI reported sector i.

$SINR_i$ is the SINR value reported by the CSI report, measured based on the signal quality from sector i and CRS interference and noise. If the UE is performing rank two transmission, two CSI reports are correspondent to different ranks. The SINRi can be computed based on the summation of the SINR reports from both ranks.

$SINR_{PDSCH}$ is the estimated PDSCH SINR value of the user equipment 120.

With the second embodiments, the at least one radio resource may comprise only one common radio resource, wherein the radio network node 110 may be configured to send CSI-RS on the common radio resource for the first and second sectors 131, 132.

In these embodiments, the command may indicate the common radio resource to be configured for CSI-RS in the user equipment 120, and any other user equipment (not shown), typically located in both the first and second sectors 131, 132, in the cell 130.

Continuing with the second embodiments, the user equipment 120 is only receiving data on PDSCH from for example sector i. However, the user equipment 120 reports the CQI with CSI-RS transmission from multiple sectors. It shall here be noted that the user equipment 120 may receive data on PDSCH from multiple sectors, but not from all sectors transmitting on the common radio resource configured in the user equipment 120. This means that the user equipment 120 could receive data from both the first and second sector 131, 132, but there are further sectors (not shown) which are transmitting CSI-RS on the same common radio resource.

The estimation of the channel quality for the user equipment 120 at the sector I may be computed based on, where channel quality is given in terms of $SINR_i$ i.e. for the sector is $$SINR_{PDSCH} = \frac{P_i^{TX} G_{i,e}}{\sum_{j=0}^{j=S-1} P_j^{TX} G_{j,e}} SINR_{CQI\_i}, \quad \text{(Eq. 2)}$$

where $SINR_{PDSCH}$ is the estimated SINR value of sector i that is transmitting PDSCH.

$SINR_{CQI_{13}i}$ is the UE reported channel quality, SINR value, and the signal are transmitted from all sectors within S in the combined cell. If the UE is performing rank two transmission, two CSI reports are correspondent to different ranks. The $SINR_{CQI\_i}$ can be computed based on the summation of the SINR reports from both ranks.

Generally, the channel quality in terms of SINR for the user equipment 120 in TM9 in a multi-sector cell, such as the cell 130, is given as a product from the set of CQI reports times a function F of downlink transmit power for reported sector i downlink channel quality gain for reported sector i, i.e:

$SINR_{PDSCH} = CQI_{reported} * F(P_i, G_i)$, i=1,2, . . . nrOfSectors−1

The function F is given by Eq. 1 for the first embodiments and by Eq. 2 for the second embodiments.

Action 213

The radio network node 110 may schedule the downlink transmission based on the estimated channel quality, while performing link adaptation for the downlink transmission based on the estimated channel quality.

This means that the channel quality, such as PDSCH channel quality in terms of SINR, may be used for scheduling and link adaptation.

For the first and second embodiments, it is possible that the radio network node 110 may select a new rank based on the channel quality, e.g. PDSCH SINR, which overrides a rank reported by the user equipment 120. The rank reported by the user equipment 120 may be biased based on the measurement on CSI-RS instead of PDSCH.

The radio network node 110 may now again return to action 202 to repeatedly, e.g. at a regular or irregular time interval, perform one or more of the actions described above. The radio network node 110 may wait before returning to action 202 or the radio network node 110 may immediately return to action 202.

Figure 3:
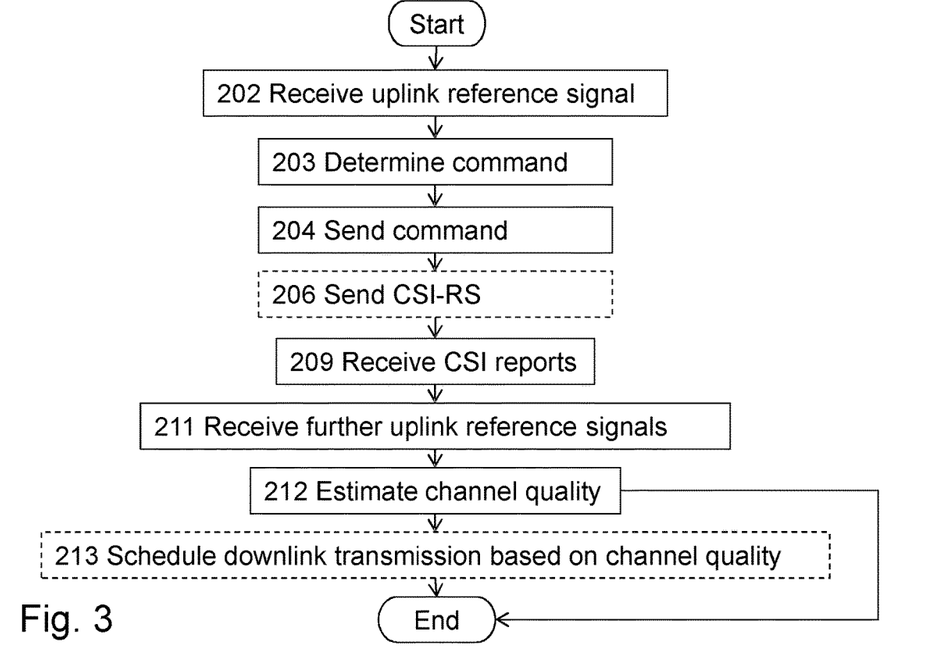
FIG. 3 is a flowchart illustrating embodiments of the method in the radio network node.

In FIG. 3, a schematic flowchart of exemplifying methods in the radio network node 110 is shown. The same reference numerals as above have been used to denote the same or similar features, in particular the same reference numerals have been used to denote the same or similar actions. Accordingly, the radio network node 110 performs a method for for estimating channel quality for a downlink transmission to a user equipment 120.

As mentioned, the radio network node 110 operates a radio carrier, forming a first sector 131 and a second sector 132, wherein the user equipment 120 is located in the first and second sectors 131, 132, wherein the radio network node 110 is configured to send, on at least one radio resource of the radio carrier, Channel State Information Reference Signals "CSI-RS" in the first and second sectors 131, 132, wherein the user equipment 120 is configured to receive, on the radio carrier, the downlink transmission from both the first and second sectors 131, 132.

Again, the radio network node 110 may have configured the user equipment 120 to operate in transmission mode 9. The first sector 131 may be neighbouring to the second sector 132. The channel quality may be a Signal-To-Interference-and-Noise-ratio, a Signal-To-Interference-ratio, a Signal-To-Noise-ratio, a Reference Signal Received Power, a Received Signal Strength Indicator, Reference Signal Received Quality or the like. The radio network node 110 may operate in Time Division Duplex "TDD" mode or Frequency Division Duplex "FDD" mode. The radio network node 110 may operate the first and second sectors 131, 132 on the radio carrier.

One or more of the following actions may be performed in any suitable order.

Action 202

The radio network node 110 receives uplink reference signals from the user equipment 120.

Action 203

The radio network node 110 determines a command based on the uplink reference signals, wherein the command indicates one of said at least one radio resource to be configured for reception of the CSI-RS in the user equipment 120.

In some embodiments, the at least one radio resource may comprise a first radio resource and a second radio resource, wherein the radio network node 110 may be configured to send CSI-RS on the first radio resource for the first sector 131, and to send CSI-RS on the second radio resource for the second sector 132.

Then, the command may indicate the first radio resource to be configured for the CSI-RS in the user equipment 120, when power received at the user equipment 120 for the first sector 131 may be greater than power received at the user equipment 120 for the second sector 132, wherein power received at the user equipment 120 may be estimated based on the uplink reference signals.

In some other embodiments, the at least one radio resource may comprise only one common radio resource, wherein the radio network node 110 may be configured to send CSI-RS on the common radio resource for the first and second sectors 131, 132.

Then, the command may indicate the common radio resource to be configured for CSI-RS in the user equipment 120.

Action 204

The radio network node 110 sends the command to the user equipment 120, whereby the user equipment 120 is able to measure Channel State Information for the radio carrier according to the command.

Action 206

The radio network node 110 may send CSI-RS to e.g. the user equipment 120.

Action 209

The radio network node 110 receives, from the user equipment 120, a set of CSI reports, wherein the reports are generated by the user equipment 120 according to the command.

Action 211

The radio network node 110 receives, on the radio carrier, further uplink reference signals from the user equipment 120.

Action 212

The radio network node 110 estimates channel quality for the downlink transmission based on the set of CSI reports and the further uplink reference signals.

Action 213

The radio network node 110 may schedule the downlink transmission based on the estimated channel quality, while performing link adaptation for the downlink transmission based on the estimated channel quality.

Figure 4:
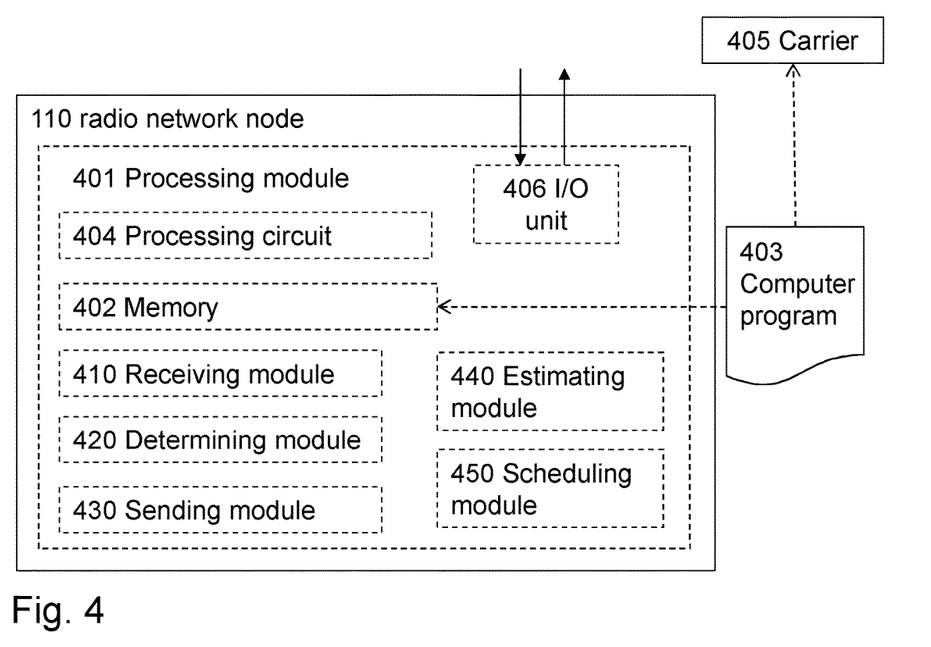
FIG. 4 is a block diagram illustrating embodiments of the radio network node.

With reference to FIG. 4, a schematic block diagram of embodiments of the radio network node 110 of FIG. 1 is shown. The radio network node 110 is thus configured to estimate channel quality for a downlink transmission to a user equipment 120

As mentioned, the radio network node 110 operates a radio carrier, forming a first sector 131 and a second sector 132, wherein the user equipment 120 is located in the first and second sectors 131, 132 The first sector 131 may be neighbouring to the second sector 132. The radio network node 110 may operate the first and second sectors 131, 132 on the radio carrier. The radio network node 110 is configured to send, on at least one radio resource of the radio carrier, Channel State Information Reference Signals "CSI-RS" in the first and second sectors 131, 132, wherein the user equipment 120 is configured to receive, on the radio carrier, the downlink transmission from both the first and second sectors 131, 132.

Again, the radio network node 110 may have configured the user equipment 120 to operate in transmission mode 9. The radio network node 110 may operate in Time Division Duplex "TDD" mode or Frequency Division Duplex "FDD" mode.

The radio network node 110 may comprise a processing module 401, such as a means, one or more hardware modules and/or one or more software modules for performing the methods described herein.

The radio network node 110 may further comprise a memory 402. The memory may comprise, such as contain or store, a computer program 403.

According to some embodiments herein, the processing module 401 comprises, e.g. 'is embodied in the form of' or 'realized by', a processing circuit 404 as an exemplifying hardware module. In these embodiments, the memory 402 may comprise the computer program 403, comprising computer readable code units executable by the processing circuit 404, whereby the radio network node 110 is operative to perform the methods of FIG. 2 and/or FIG. 3.

In some other embodiments, the computer readable code units may cause the radio network node 110 to perform the method according to FIG. 2 and/or 3 when the computer readable code units are executed by the radio network node 110.

FIG. 4 further illustrates a carrier 405, comprising the computer program 403 as described directly above. The carrier 405 may be one of an electronic signal, an optical signal, a radio signal, and a computer readable medium.

In some embodiments, the processing module 401 comprises an Input/Output unit 406, which may be exemplified by a receiving module and/or a sending module as described below when applicable.

In further embodiments, the processing module 401 may comprise one or more of a receiving module 410, a determining module 420, a sending module 430, an estimating module 440 and a scheduling module 450 as exemplifying hardware modules. In other examples, one or more of the aforementioned exemplifying hardware modules may be implemented as one or more software modules.

Therefore, according to the various embodiments described above, the radio network node 110, the processing module 401 and/or the receiving module 410 is operative to, such as configured to, receive uplink reference signals from the user equipment 120.

The radio network node 110, the processing module 401 and/or the determining module 420 is operative to, such as configured to, determine a command based on the uplink reference signals, wherein the command indicates one of said at least one radio resource to be configured for reception of the CSI-RS in the user equipment 120.

As mentioned with the first embodiments, the at least one radio resource may comprise a first radio resource and a second radio resource, wherein the radio network node 110 may be configured to send CSI-RS on the first radio resource for the first sector 131, and to send CSI-RS on the second radio resource for the second sector 132. The command may indicate the first radio resource to be configured for the CSI-RS in the user equipment 120, when power received at the user equipment 120 for the first sector 131 may be greater than power received at the user equipment 120 for the second sector 132, wherein power received at the user equipment 120 may be estimated based on the uplink reference signals.

As mentioned with the second embodiments, the at least one radio resource may comprise only one common radio resource, wherein the radio network node 110 may be configured to send CSI-RS on the common radio resource for the first and second sectors 131, 132.

The command may indicate the common radio resource to be configured for CSI-RS in the user equipment 120.

The radio network node 110, the processing module 401 and/or the sending module 430 is operative to, such as configured to, send the command to the user equipment 120, whereby the user equipment 120 is able to measure Channel State Information for the radio carrier according to the command.

The radio network node 110, the processing module 401 and/or the receiving module 410, or another receiving module (not shown), is operative to, such as configured to, receive, from the user equipment 120, a set of CSI reports, wherein the reports are generated by the user equipment 120 according to the command.

The radio network node 110, the processing module 401 and/or the receiving module 410, or a further receiving module (not shown), is operative to, such as configured to, receive, on the radio carrier, further uplink reference signals from the user equipment 120.

The radio network node 110, the processing module 401 and/or the estimating module 440, or another receiving module (not shown), is operative to, such as configured to, estimate channel quality for the downlink transmission based on the set of CSI reports and the further uplink reference signals.

The channel quality may be a Signal-To-Interference-and-Noise-ratio, a Signal-To-Interference-ratio, a Signal-To-Noise-ratio, a Reference Signal Received Power, a Received Signal Strength Indicator, Reference Signal Received Quality or the like.

The radio network node 110, the processing module 401 and/or the scheduling module 450 may be operative to, such as configured to, schedule the downlink transmission based on the estimated channel quality, while performing link adaptation for the downlink transmission based on the estimated channel quality.

As used herein, the term "node" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments are implemented in a distributed manner.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of", such as set of devices, may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a radio network node for estimating channel quality for a downlink transmission to a user equipment, wherein the radio network node operates a radio carrier, forming a first sector and a second sector, wherein the user equipment is located in the first and second sectors, wherein the radio network node is configured to send, on at least one radio resource of the radio carrier, Channel State Information Reference Signals (CSI-RS) in the first and second sectors, wherein the user equipment is configured to receive, on the radio carrier, the downlink transmission from both the first and second sectors, the method comprising:
    receiving uplink reference signals from the user equipment;
    determining a command based on the uplink reference signals, wherein the command indicates one of said at least one radio resource to be configured for reception of the CSI-RS in the user equipment;
    sending the command to the user equipment, whereby the user equipment is able to measure Channel State Information (CSI) for the radio carrier according to the command;
    receiving, from the user equipment, a set of CSI reports, wherein the CSI reports are generated by the user equipment according to the command;
    receiving, on the radio carrier, further uplink reference signals from the user equipment, wherein the further uplink reference signals are closer in time than the uplink reference signals, on which the command was based, in relation to an upcoming time slot, in which the downlink transmission is to be transmitted; and
    estimating channel quality for the downlink transmission based on the set of CSI reports and the further uplink reference signals.

2. The method according to claim 1, wherein the at least one radio resource comprises a first radio resource and a second radio resource, wherein the radio network node is configured to send CSI-RS on the first radio resource for the first sector, and to send CSI-RS on the second radio resource for the second sector.

3. The method according to claim 2, wherein the command indicates the first radio resource to be configured for the CSI-RS in the user equipment, when power received at the user equipment for the first sector is greater than power received at the user equipment for the second sector, wherein power received at the user equipment is estimated based on the uplink reference signals.

4. The method according to claim 1, wherein the at least one radio resource comprises only one common radio resource, wherein the radio network node is configured to send CSI-RS on the common radio resource for the first and second sectors.

5. The method according to claim 4, wherein the command indicates the common radio resource to be configured for CSI-RS in the user equipment.

6. The method according to claim 1, wherein the method comprises:
    scheduling the downlink transmission based on the estimated channel quality, while performing link adaptation for the downlink transmission based on the estimated channel quality.

7. The method according to claim 1, wherein the radio network node has configured the user equipment to operate in transmission mode.

8. The method according to claim 1, wherein the first sector is neighboring to the second sector.

9. The method according to claim 1, wherein the channel quality is a Signal-To-Interference-and-Noise-ratio, a Signal-To-Interference-ratio, a Signal-To-Noise-ratio, a Reference Signal Received Power, a Received Signal Strength Indicator or Reference Signal Received Quality.

10. The method according to claim 1, wherein the radio network node operates in Time Division Duplex (TDD) mode or Frequency Division Duplex (FDD) mode.

11. The method according to claim 1, wherein the radio network node operates the first and second sectors on the radio carrier.

12. A radio network node configured to estimate channel quality for a downlink transmission to a user equipment, wherein the radio network node operates a radio carrier, forming a first sector and a second sector, wherein the user equipment is located in the first and second sectors, wherein the radio network node is configured to send, on at least one radio resource of the radio carrier, Channel State Information Reference Signals (CSI-RS) in the first and second sectors, wherein the user equipment is configured to receive, on the radio carrier, the downlink transmission from both the first and second sectors, the radio network node comprising processing circuitry to:
    receive uplink reference signals from the user equipment;
    determine a command based on the uplink reference signals, wherein the command indicates one of said at least one radio resource to be configured for reception of the CSI-RS in the user equipment;
    send the command to the user equipment, whereby the user equipment is able to measure Channel State Information for the radio carrier according to the command;
    receive, from the user equipment, a set of CSI reports, wherein the reports are generated by the user equipment according to the command;
    receive, on the radio carrier, further uplink reference signals from the user equipment, wherein the further uplink reference signals are closer in time than the uplink reference signals, on which the command was based, in relation to an upcoming time slot, in which the downlink transmission is to be transmitted; and estimate channel quality for the downlink transmission based on the set of CSI reports and the further uplink reference signals.

13. The radio network node according to claim 12, wherein the at least one radio resource comprises a first radio resource and a second radio resource, wherein the radio network node is configured to send CSI-RS on the first radio resource for the first sector, and to send CSI-RS on the second radio resource for the second sector.

14. The radio network node according to claim 13, wherein the command indicates the first radio resource to be configured for the CSI-RS in the user equipment, when power received at the user equipment for the first sector is greater than power received at the user equipment for the second sector, wherein power received at the user equipment is estimated based on the uplink reference signals.

15. The radio network node according to claim 12, wherein the at least one radio resource comprises only one common radio resource, wherein the radio network node is configured to send CSI-RS on the common radio resource for the first and second sectors.

16. The radio network node according to claim 15, wherein the command indicates the common radio resource to be configured for CSI-RS in the user equipment.

17. The radio network node according to claim 12, wherein the radio network node is configured to:
 schedule the downlink transmission based on the estimated channel quality, while performing link adaptation for the downlink transmission based on the estimated channel quality.

18. The radio network node according to claim 12, wherein the radio network node is configured to configure the user equipment to operate in transmission mode.

19. The radio network node according to claim 12, wherein the first sector is neighboring to the second sector.

20. The radio network node according to claim 12, wherein the channel quality is a Signal-To-Interference-and-Noise-ratio, a Signal-To-Interference-ratio, a Signal-To-Noise-ratio, a Reference Signal Received Power, a Received Signal Strength Indicator or Reference Signal Received Quality.

\* \* \* \* \*